United States Patent
Joshi (10) Patent No.: US 6,728,392 B1
(45) Date of Patent: Apr. 27, 2004

(54) SHAPE COMPARISON USING A ROTATIONAL VARIATION METRIC AND APPLICATIONS THEREOF

(75) Inventor: Rajashri Joshi, Schaumburg, IL (US)

(73) Assignee: Navigation Technologies Corp., Chicago, IL (US)

( * ) Notice: Subject to any disclaimer, the term of this patent is extended or adjusted under 35 U.S.C. 154(b) by 519 days.

(21) Appl. No.: 09/772,586

(22) Filed: Jan. 30, 2001

(51) Int. Cl.[7] ............................................. G06K 9/00
(52) U.S. Cl. ................................... 382/104; 701/28
(58) Field of Search ............................. 382/100, 103, 382/104, 105, 106, 107, 174, 201, 209, 212, 199, 203, 219, 237, 274; 701/19, 20, 27, 28, 118, 119, 213; 340/988, 989, 990; 205/972; 345/442

(56) References Cited

U.S. PATENT DOCUMENTS

| | | | | |
|---|---|---|---|---|
| 5,438,517 A | * | 8/1995 | Sennott et al. ............. | 701/213 |
| 5,470,233 A | * | 11/1995 | Fruchterman et al. ....... | 434/112 |
| 5,497,451 A | | 3/1996 | Holmes | |
| 5,566,288 A | * | 10/1996 | Koerhsen .................... | 345/442 |
| 6,029,173 A | | 2/2000 | Meek et al. | |
| 6,078,849 A | * | 6/2000 | Brady et al. ................ | 701/28 |
| 6,138,084 A | * | 10/2000 | Mine ............................ | 702/157 |
| 6,224,736 B1 | * | 5/2001 | Miyamoto .................... | 205/97 |
| 6,424,736 B1 | | 7/2002 | Meitzler et al. | |
| 6,441,752 B1 | * | 8/2002 | Fomukong ................... | 340/988 |
| 6,532,304 B1 | | 3/2003 | Liu et al. .................... | 382/203 |

FOREIGN PATENT DOCUMENTS

| | | | |
|---|---|---|---|
| EP | 0 394 517 B1 | 6/1993 | ............ G01C/21/22 |
| EP | 0 807 803 A2 | 11/1997 | ............ G01C/21/20 |
| WO | WO 95/32483 | 11/1995 | ............ G06K/9/20 |

OTHER PUBLICATIONS

U.S. patent application Ser. No. 09/729,939, filed Dec. 5, 2000, entitled "Method and System for Representation of Geographic Features in a Computer–Based System".
U.S. patent application Ser. No. 09/772,587, filed Jan. 30, 2001, entitled "Bowing Coefficient Representation of Curvature of Geographic Features".

* cited by examiner

Primary Examiner—Jayanti K. Patel
Assistant Examiner—Seyey Azarian
(74) Attorney, Agent, or Firm—Frank J. Kozak; Jon D. Shutter; Lawrence M. Kaplan (57) ABSTRACT

A method for comparing geometric shapes to each other is disclosed. The method includes determination of a rotational variation metric. The shapes to be compared are scaled so that their lengths are equal and tangent vectors at corresponding locations along the geometric shapes are determined. The angle between each pair of corresponding tangent vectors for each of these locations is then plotted as a function of the length along the geometric shapes. The variation around the mean angle between the tangent vectors for the locations along the geometric shapes being compared is the rotational variation coefficient. This process defines a rotational variation metric which indicates how closely the two geometric shapes match. The rotational variation metric can be used in various geographic applications, including vehicle positioning, sign recognition, and evaluating geographic database accuracy.

17 Claims, 10 Drawing Sheets

FIG.9A
Step 1 – Angle between the tangent vectors is 45.

FIG.9B
Step 2 – Angle between the tangent vectors is 0.

FIG.9C
Step 3 – Angle between the tangent vectors is 45.

FIG.9D
Step 4 – Angle between the tangent vectors is 0.

SHAPE COMPARISON USING A ROTATIONAL VARIATION METRIC AND APPLICATIONS THEREOF

BACKGROUND OF THE INVENTION

The present invention relates to data representations of geographic features and more particularly, the present invention relates to a way to measure how closely one geometric shape matches another geometric shape.

The need to compare geometric shapes arises in various applications relating to the use of data representations of geographic features. Some of these applications include vehicle positioning, measuring geographic database accuracy, and road sign recognition. For instance, in a vehicle positioning application, one way to determine the position of a moving vehicle with respect to a map database that represents the road network upon which the vehicle is traveling is to find the best match between the vehicle's path, as determined by processing sensor data, and the data representation of the roads that form the road network upon which the vehicle is traveling.

Figure 1:
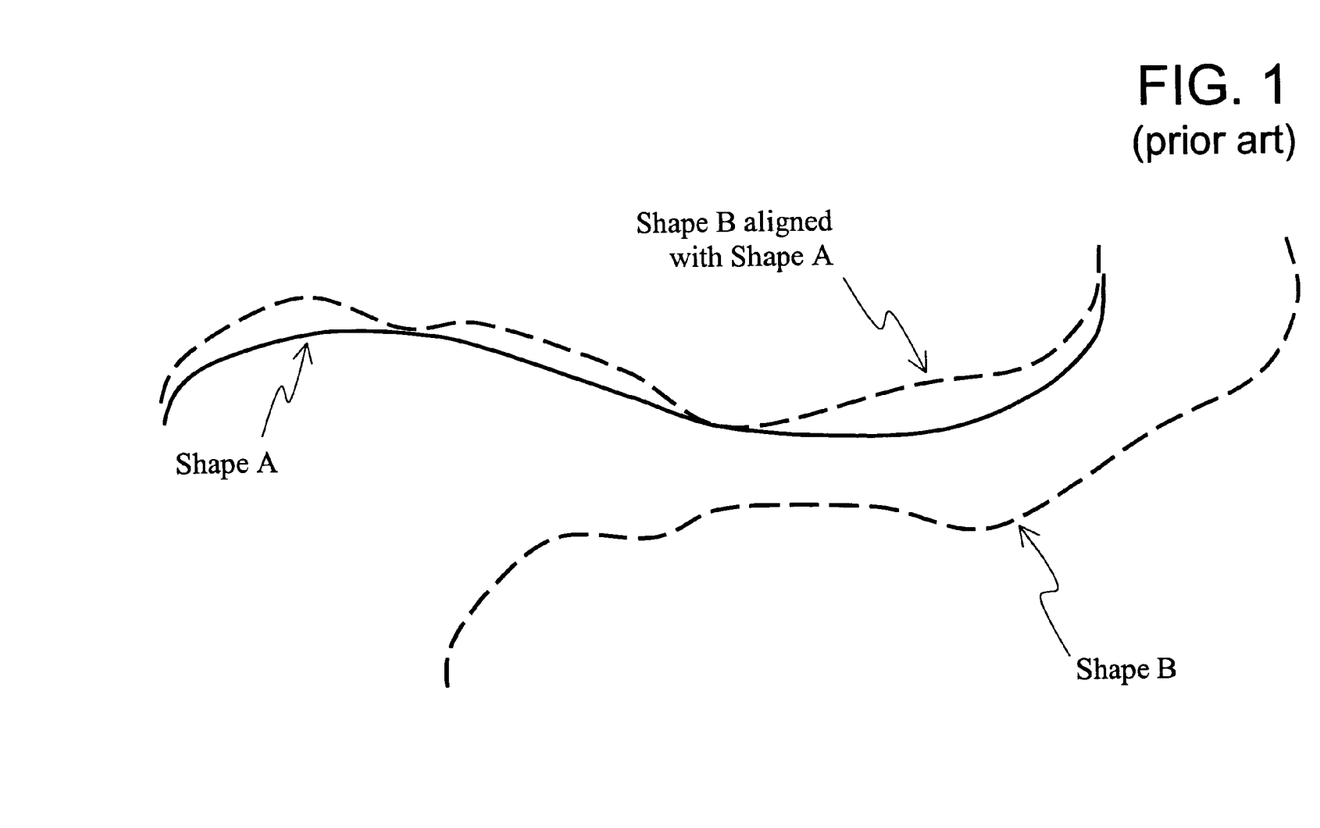
FIG. 1 is a diagram that illustrates a prior art method of comparing two geometric shapes labeled shape A and shape B.

One standard method for determining geometric distortion (i.e., how much one geometric shape is different from another geometric shape) involves finding the area between the two shapes. FIG. 1 illustrates this standard method. FIG. 1 shows a geometric shape labeled "shape A" and another shape labeled "shape B." In order for this standard process to yield a true measure of distortion, it is required that the shapes be aligned to minimize the area. This alignment is shown in FIG. 1 by the line labeled "Shape B aligned with Shape A." However, it is not always clear how to perform this alignment, especially automatically. An alternative is to compute the area for all translations and rotations of the two geometric shapes. The minimum area computed is a measure of the geometric distortion between the two shapes. This process can be time consuming and computationally intensive.

Accordingly, there exists a need for an improved way to compare one geometric shape to another geometric shape.

SUMMARY OF THE INVENTION

To address these and other objectives, the present invention provides a method for comparing geometric shapes to each other. The method includes determination of a rotational variation coefficient. Tangent vectors at corresponding locations along the geometric shapes to be compared are determined and the angle between pairs of tangent vectors for each of these locations is plotted as a function of the distance along the shapes. The variance of the plot around the mean value is the rotational variation coefficient. This process defines a rotational variation metric which indicates how closely the two geometric shapes match.

The rotational variation metric can be used in various applications that use geographic data. The rotational variation metric can be used in vehicle positioning. By using the rotational variation metric to compare the vehicle trajectory determined from sensors to the paths of roads as represented in a map database, the location on the road on which the vehicle is likely to be located can be determined.

The rotational variation metric can be also be used for road sign recognition. The outline of an object in a detected image is compared to a plurality of different road sign shape templates. Using the rotational variation metric, the sign shape template that most closely matches the outline of the object in the detected image indicates the most likely sign.

The rotational variation metric can also be used for evaluating geographic database accuracy. The shapes of data representations of geographic features represented in a geographic database are compared to the ground truth representations of the actual features. The rotational variation metric indicates how closely the geographic database representation of each geographic feature matches the actual geographic feature.

DETAILED DESCRIPTION OF THE PRESENTLY PREFERRED EMBODIMENTS

I. Overview—Rotational Variation Metric

Translation and rotation are the only two shape and size preserving geometric transformations (besides reflection, which is not of interest for the types of applications being considered herein). If one shape is uniformly translated and/or rotated with respect to a second shape, the relative proportions are retained in the two shape representations. Thus, the problem of determining how closely two shapes compare is equivalent to determining to what degree one of the shapes can be considered to be a translated and/or rotated version of the other shape. This can be determined by computing the rotational variation coefficient, i.e., the variance of the angle between the tangents at successive points along the two shapes.

Figure 2:
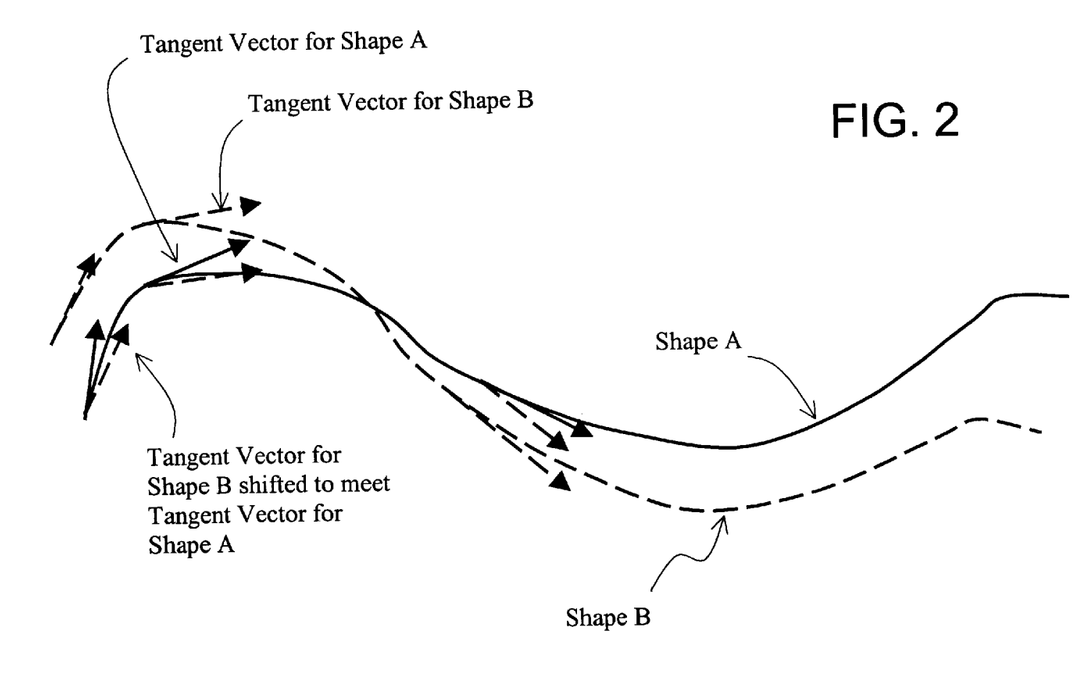
FIG. 2 is a diagram that illustrates the corresponding tangent vectors from two geometric shapes for the purpose of comparing the two shapes using the rotational variation metric, according to one embodiment of the present invention.

This concept is illustrated in FIG. 2. In FIG. 2, a first shape, labeled "shape A", is shown by the solid line and a second shape, labeled "shape B", is shown by the dashed line. Without loss of generality, shape A is designated as the reference shape. As shown in FIG. 2, shape B is translated and rotated with respect shape A. In order to compare shape B to shape A, shape B is scaled so that its length equals that of shape A. Alternatively, both shapes can be scaled to a nominal length of unity. Tangent vectors at corresponding points of shape A and shape B are then determined at locations along the two shapes. Corresponding points are determined by moving an equal distance along each shape from the nominal starting point of each shape. The tangent vectors for shape A and shape B are shown along shape A and shape B, respectively. As shown in FIG. 2, the tangent vectors to shape B are shifted to meet the corresponding tangent vectors to shape A at the starting point.

The distance between the two shapes clearly varies with length along the shapes. However, the angle between the tangent vectors at corresponding points along shape A and shape B is constant. The angle is defined between each pair of tangent vectors as the angle through which the tangent to shape B is rotated, so that it aligns with the corresponding tangent to the reference shape, shape A. Without loss of generality, let a clockwise rotation be defined as positive, and a counterclockwise rotation be defined as negative.

Figure 3:
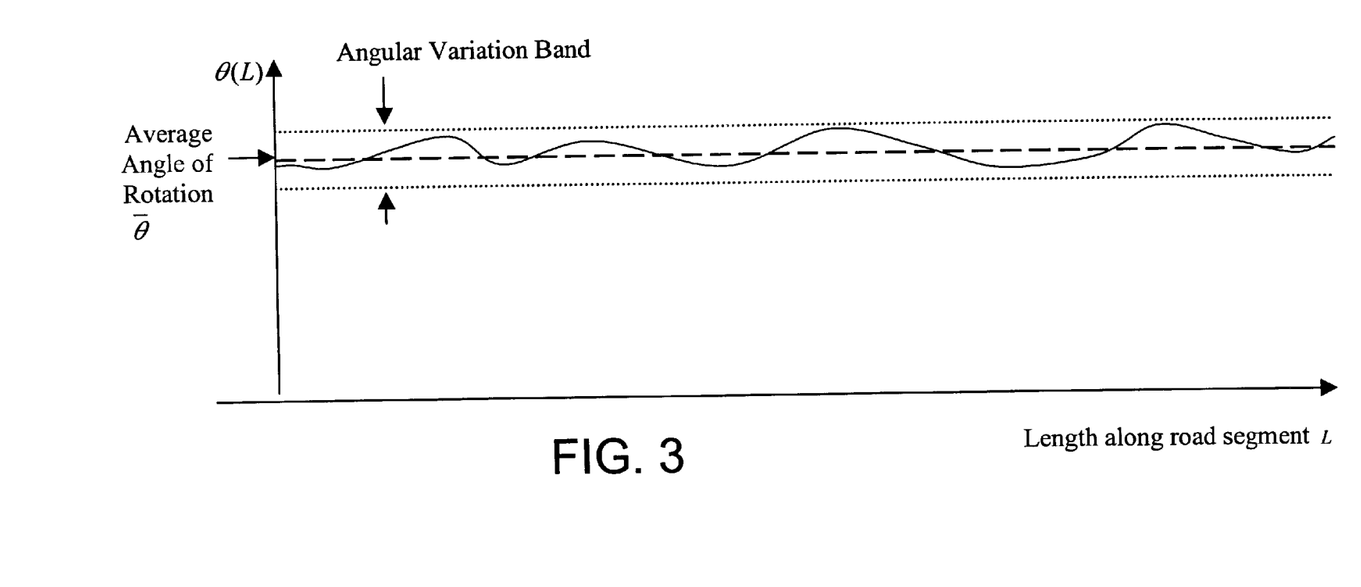
FIG. 3 is a plot of the rotational variation metric computed for the two geometric shapes shown in FIG. 2.

FIG. 3 shows the plot of the angle between the tangent vectors versus length along the ground truth segment.

The magnitude of the angle between each pair of tangent vectors $\overline{A}$ and $\overline{B}$ is given by $$\theta = \cos^{-1}\left(\frac{\overline{A} \cdot \overline{B}}{\|\overline{A}\| \|\overline{B}\|}\right).$$

Note that this method of determining geometric distortion does not require the segments to be aligned (shifted and/or rotated). The variance of the plot around the mean value is a quantitative measure of the similarity in shape. For purposes of this disclosure, this variance is referred to as the "rotational variation coefficient," ("RVC"). This process defines a rotational variation metric ("RVM") which indicates how closely the two geometric shapes match. The RVC is thus a quantitative measure of relative accuracy (geometric distortion). An RVC of zero indicates that the sampled segment is rotated with respect to the ground truth segment by a constant angle. A large RVC indicates that the angle of rotation is not constant, which means that the sampled segment has a large amount of geometric distortion.

II. Application to Vehicle Positioning (Map Matching)

A. Overview

Vehicle positioning (map matching) is the problem of determining the most likely position on a map of a traveling vehicle. One way to accomplish this goal is to compare the closeness in shape between different paths. In this case, one of the paths is the historical trajectory of the vehicle for a finite time in the past; segments in the vicinity of the vehicle are the other set of paths. The problem of vehicle positioning involves 1. determining which of these candidate paths is the true road segment on which the vehicle is currently located, and
2. on which position on the most likely path the vehicle is located.

The rotational variation metric described above defines and quantifies the geometric distortion between a pair of shapes. It can also be used for comparing the shape similarity between a vehicle trajectory and possible paths on a map in the vicinity of the vehicle. Hence this method is directly applicable to enhancing vehicle positioning.

B. Vehicle Positioning (Map Matching) Algorithm

At fixed intervals (e.g., once every second or ten seconds) the respective RVC values are computed between the vehicle trajectory and all possible map paths in the vicinity of the current vehicle position. The map path corresponding to the smallest rotational variation coefficient value is the one on which the vehicle is most likely to be located.

Figures 4A, 4B:
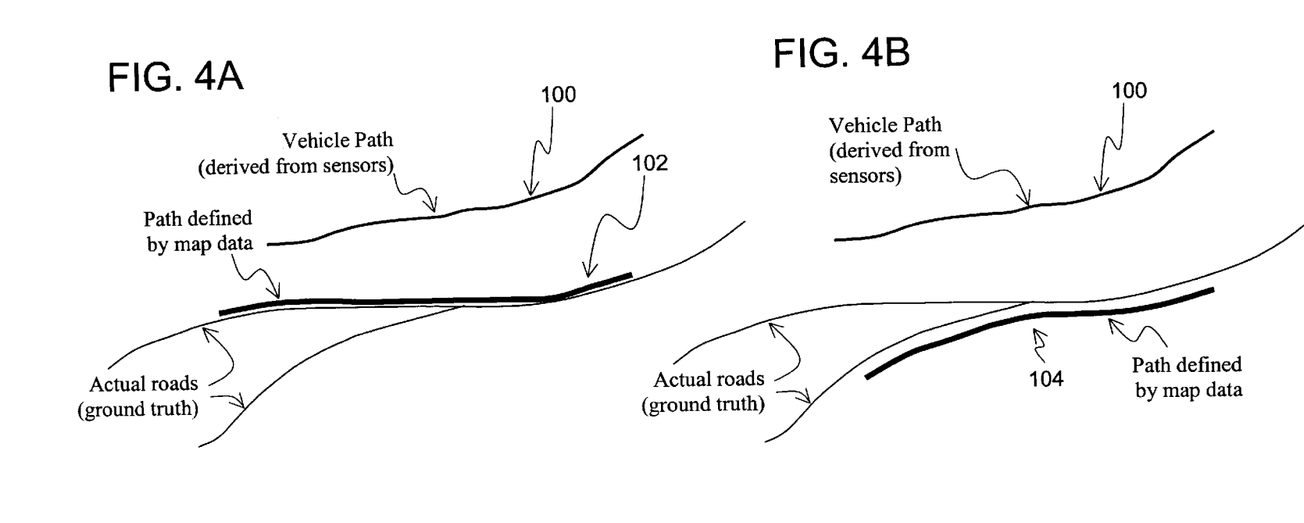
FIGS. 4A and 4B are diagrams that illustrate application of the rotational variation metric to vehicle positioning, according to another embodiment of the present invention.

An example illustrating use of the rotational variation metric for vehicle positioning is illustrated in FIGS. 4A and 4B. FIGS. 4A and 4B show a true vehicle path 100 (obtained from dead reckoning and sensor fusion) and several possible paths 102 and 104, defined by data representing the actual road network. By computing the RVC value between the vehicle path and the possible road paths, the path for which the RVC value is minimum can be selected as the most likely path on the map (in this case, the path, labeled 102 in FIG. 4A), because the vehicle path 100 is a more or less uniformly rotated version of the path labeled 102.

III. Application to Template Matching for Automated Road Sign Recognition

A. Overview

Road sign recognition is a problem which lies within the larger domain of object recognition. The ability to recognize signs and other objects in cluttered scenes can be of use for geographic data attribute collection. There are three aspects to the problem of sign recognition. These include 1. detection using color information or spectral characteristics,
2. detection using shape information or geometric characteristics and location, and
3. sign content recognition.

In practice, all three types of information are used in combination. The rotational variation metric, described above, can be applied to item 2, i.e., the use of geometric reasoning for road sign recognition.

One method of using geometric information for sign recognition is template matching. Template matching is the process of searching for instances of prestored patterns or templates in an image. Conventionally, template matching is accomplished by computing the cross correlation between the unclassified shape in the image and the templates and then determining which (if any) of the templates is highly correlated with the unclassified shape. This approach works best in the case where there are no distortions of the unclassified shapes other than additive noise. The conventional approach works less well when the unclassified shape has been distorted by translation, rotation, shearing, warping, expansion, scaling or occlusion. Alternatively, the Hough transform can be used for detecting straight edges in the image, however this approach matches only parts of the template at a time; it does not treat the template as a whole. In contrast to the above two approaches, use of the rotational variation metric, described above, treats the template as a whole and works even if the shape in the image is translated, rotated, or scaled in any manner.

When the rotational variation metric is used for road sign recognition, the geographic feature being compared is a road sign, or more specifically, the outline of the road sign. The road sign outline is compared to a plurality of templates each of which is a representation of a different road sign shape.

B. Preprocessing (1). Edge Detection

To apply any template matching algorithm, it is first necessary to extract the edges or outline of objects in the image. This can be done using any standard approach. Canny, Sobel and Laplacian edge detectors, all of which are derivative based, are standard edge detection methods. More recently, wavelets have been used to perform multiresolution edge detection. Any of these methods may be used; wavelet edge detection may have the advantage of yielding a multiresolution template matching algorithm.

(2). Raster to Vector Conversion

Once the edges in the image have been extracted, each pixel location in the sampled image has the value 0 or 1. A 1 corresponds to the presence of an edge, 0 corresponds to the absence of an edge. This black and white raster image is next converted to vector form, where each pixel with a value 1 is represented as a coordinate pair.

C. Template Matching Algorithm

Figure 5:
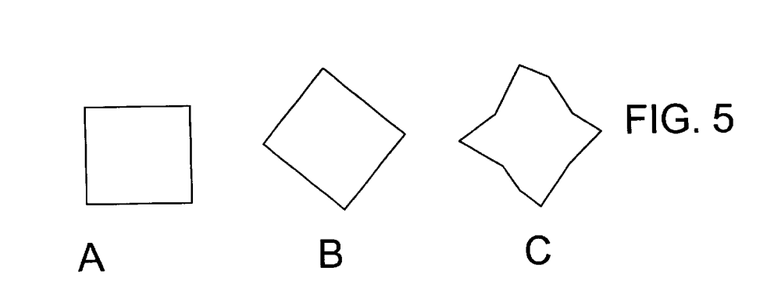
FIG. 5 is a diagram that illustrates application of the rotational variation metric to sign recognition, wherein a shape, labeled A, is compared to each of two other shapes, labeled B and C.

The basis for the template matching algorithm is the rotational variation metric. This metric can be applied to the problem of template matching for sign recognition. The rotational variation metric uses the fact that the angle between tangent vectors to corresponding points of two geometrically similar planar objects is near constant, while the angle between tangent vectors to corresponding points of two geometrically dissimilar planar objects is highly variable. In other words, the variation in the angle is a quantitative measure of the geometric error between the two shapes. FIG. 5 illustrates an example in which the rotational variation metric can be determined visually.

Figure 6:
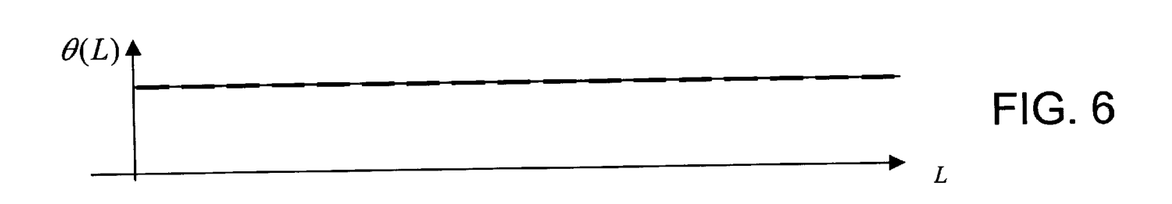
FIG. 6 is a plot of the rotational variation comparing the shapes A and B in FIG. 5.

FIG. 5 shows three shapes. In FIG. 5, it can be seen that although the objects are mutually translated and rotated, objects A and B are identical in shape. If the angle between tangent vectors of corresponding points on the two objects is determined, and this angle is plotted as a function of length along one of the objects, then this plot will be constant, as shown in FIG. 6.

Figure 7:
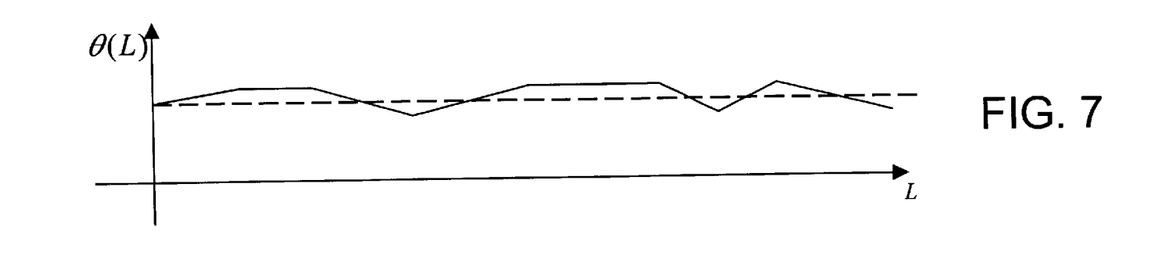
FIG. 7 is a plot of the rotational variation comparing the shapes A and C in FIG. 5.

Referring to objects B and C in FIG. 5, the plot of the angle between tangent vectors to the two objects at corresponding points as a function of length along one of the segments will no longer be constant. It will instead have the appearance shown in FIG. 7.

The variation of the angle around the mean value (shown as dashed lines in FIGS. 6 and 7) is a measure of the dissimilarity in shape of the two objects. This variance is the rotational variance metric for the given pair of objects. For the objects labeled A and B in FIG. 5, the rotational variation coefficient is zero and for the objects labeled A and C, the rotational variation coefficient is greater than zero. The computation of the rotational variation metric thus involves determining the angle between tangent vectors to each pair of objects and determining the deviation of this angle from a constant value.

Figure 8:
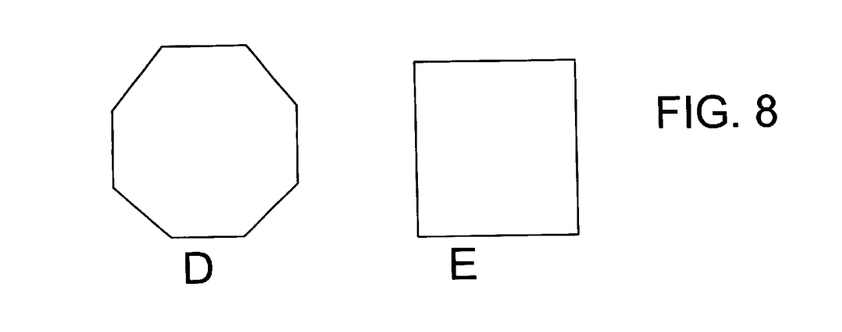
FIG. 8 is a diagram that illustrates application of the rotational variation metric to sign recognition, wherein a shape, labeled D, is compared to another shape, labeled E.

FIG. 8 shows another group of objects, labeled D and E. The objects, D and E, in FIG. 8 consist of straight edges. The steps for determining the rotational variation coefficient between the shapes of these objects are illustrated in FIGS. 9A–9H. Without loss of generality, the shape labeled E is designated as the reference shape.

Figure 9A:
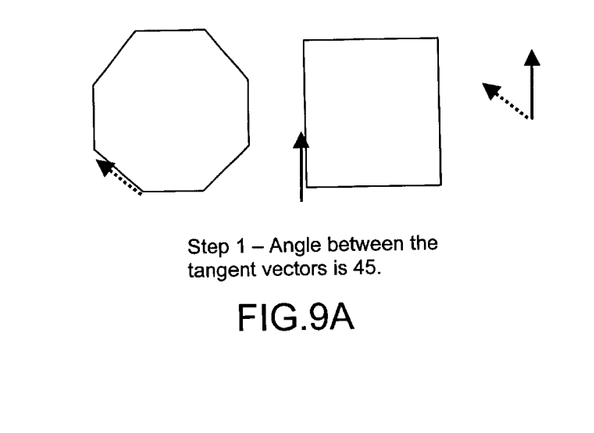
FIGS. 9A–9H illustrate steps performed when using the rotational variation metric to compare the shapes D and E in FIG. 8.

Corresponding starting points on the shape representations of the objects are selected. The starting point can be selected at any convenient location on the shape representation of the object. Referring to FIG. 9A, a starting point is selected at the lower left-hand corner of each shape. Then, proceeding clockwise (or alternatively, counterclockwise) along each shape, a tangent vector is determined. From FIG. 9A the angle between the tangent vector of the shape A and the tangent vector of the shape B is 45°.

Figure 9B:
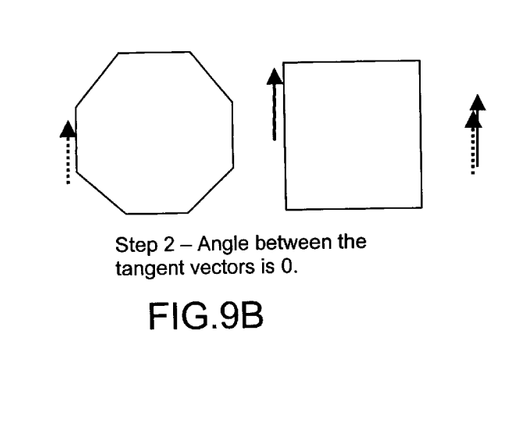
Figure 9C:
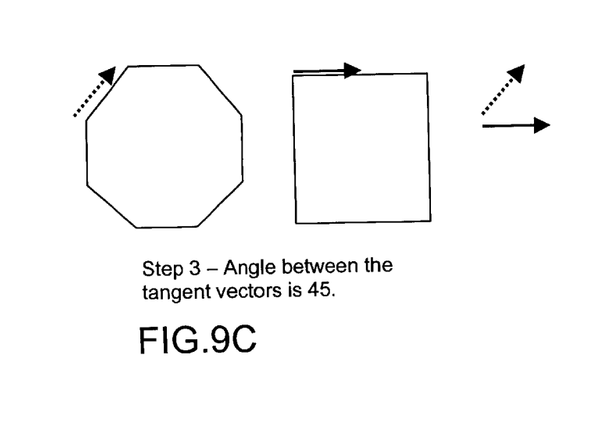
Figure 9D:
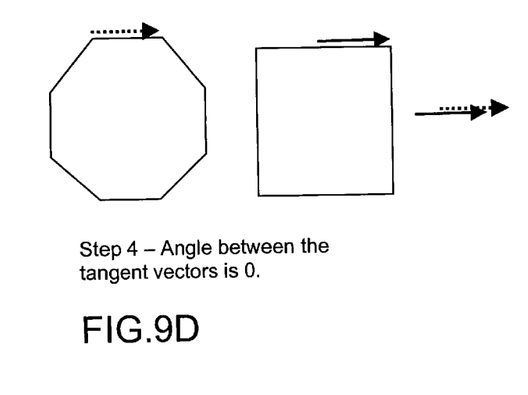
Figure 9E:
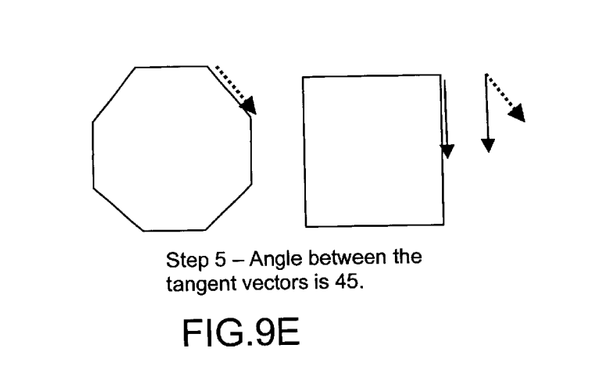
Figure 9F:
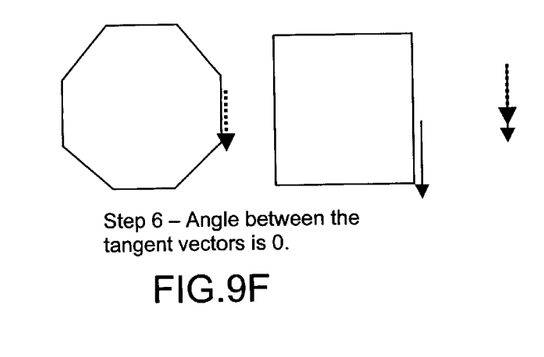
Figure 9G:
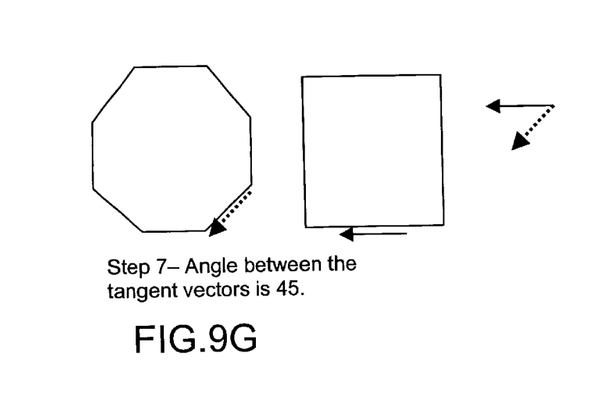
Figure 9H:
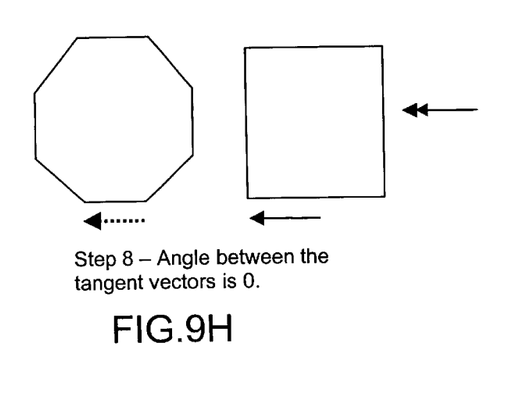

Referring to FIG. 9B, continuing clockwise from the positions in FIG. 9A, tangent vectors are determined for each shape. In FIG. 9B, the angle between these new tangent vectors is 0°.

The process is continued until all points are traversed. FIGS. 9C–9H show the steps of continuing the process of determining the angles between the tangent vectors for both shapes.

Figure 10:
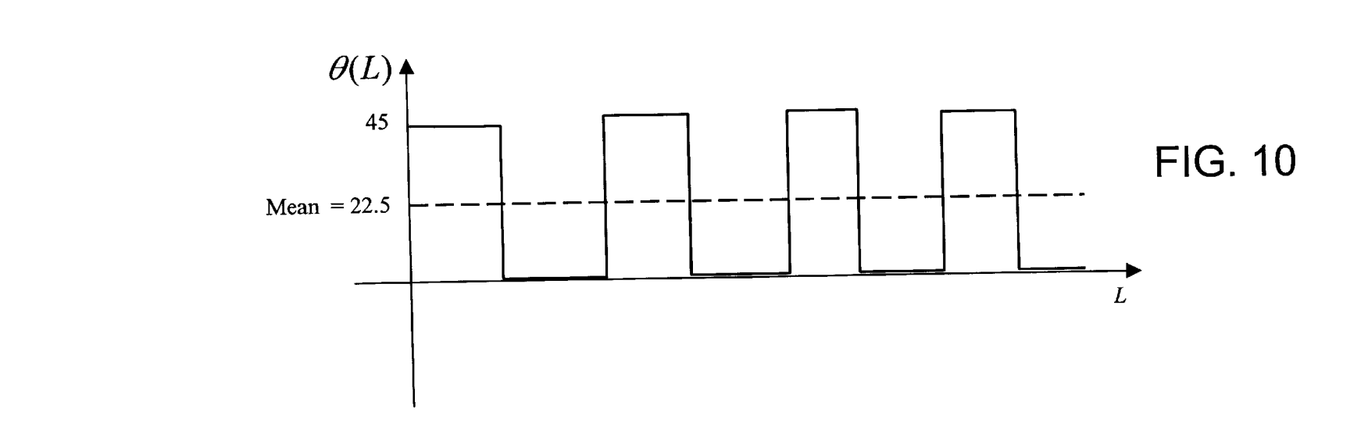
FIG. 10 is a plot of the rotational variation generated from the steps shown in FIGS. 9A–9H.

FIG. 10 shows the plot of the angle for all corresponding points on objects D and E. Note that this plot is not unique. It depends on the selected starting point on the object. However, the average value, 22.5, and the variance of the plot, i.e., the rotational variation metric, (506.25 in this case), are both unique, and thus can be used for object recognition purposes.

Figure 11:
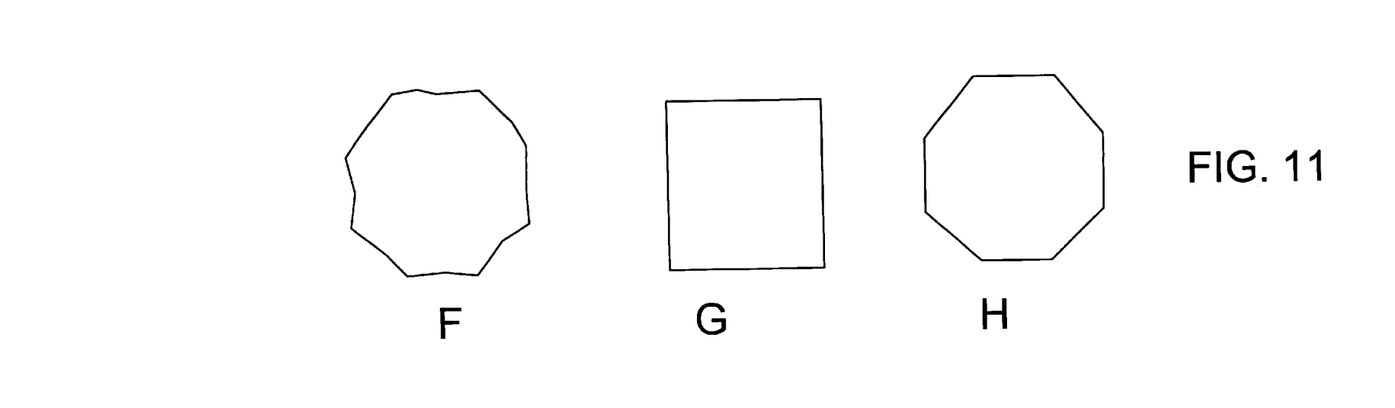
FIG. 11 is a diagram that illustrates application of the rotational variation metric to sign recognition, wherein a shape, labeled F, is compared to each of two other shapes, labeled G and H.
Figure 12:
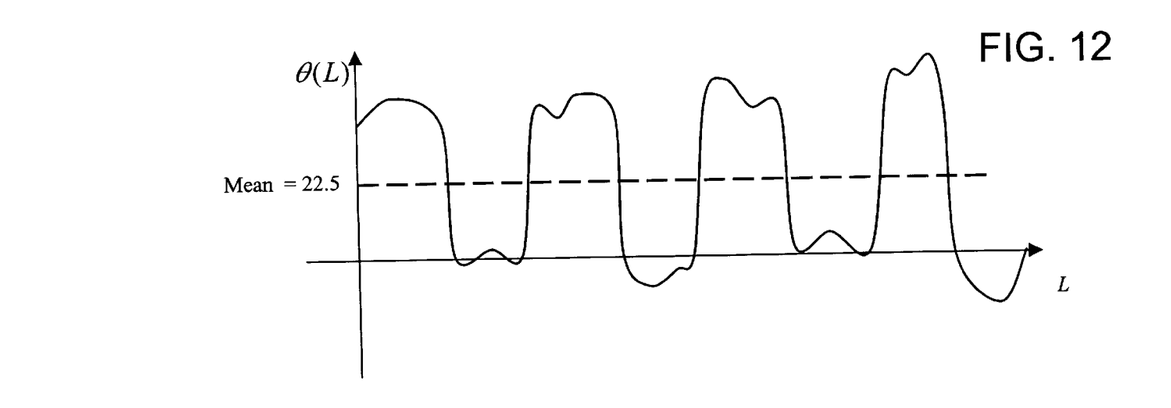
FIG. 12 is a plot of the rotational variation comparing the shapes F and G in FIG. 11.
Figure 13:
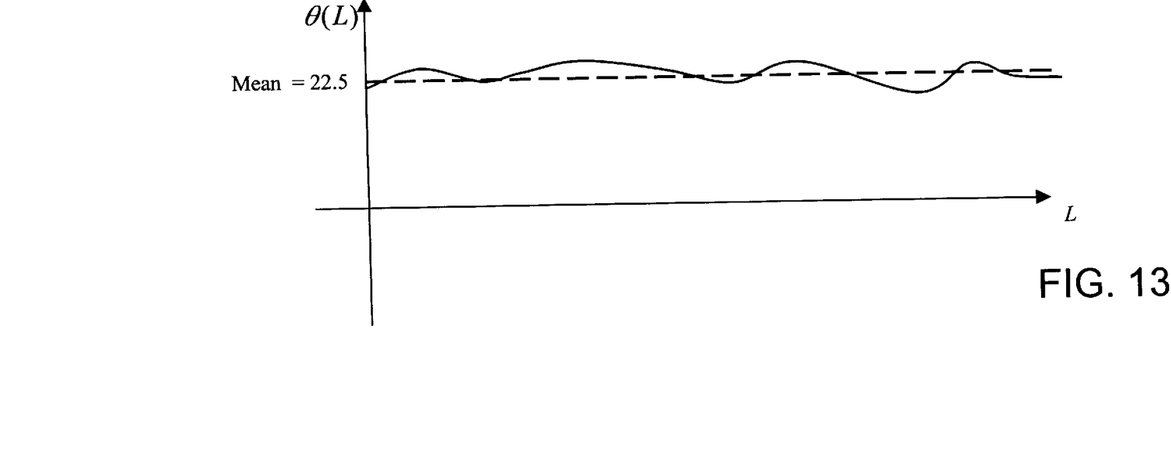
FIG. 13 is a plot of the rotational variation comparing the shapes F and H in FIG. 11.

Another example is shown in FIG. 11. FIG. 11 shows shapes of three objects, F, G, and H. Suppose that object F is the (noisy) outline of a sign extracted from an image using the edge detection and rasterization preprocessing steps described above. The goal is to determine whether this outline is actually a representation of object G or of object H. Comparing object F with object G produces the plot shown in FIG. 12. Comparing object F with object H produces the plot shown in FIG. 13. Clearly, the variation in the plot in FIG. 13 is much smaller than that of the plot in FIG. 12. This is to be expected since it can be seen from a visual comparison of the objects that object F matches the overall shape of object H much better than object G.

To use the rotational variation metric for template matching, the rotational variation coefficient is computed (FIGS. 12 and 13) between the unclassified object (object F in FIG. 11) and each of the possible templates (objects G and H). The template for which the metric is minimum is the solution. Hence, the rotational variation metric is an effective tool for object recognition, or road sign recognition in particular. Note that the method described above can also be used just as effectively for matching sign text or other sign content.

IV. Application to Determining Relative Accuracy of a Geographic Database

Figure 14:
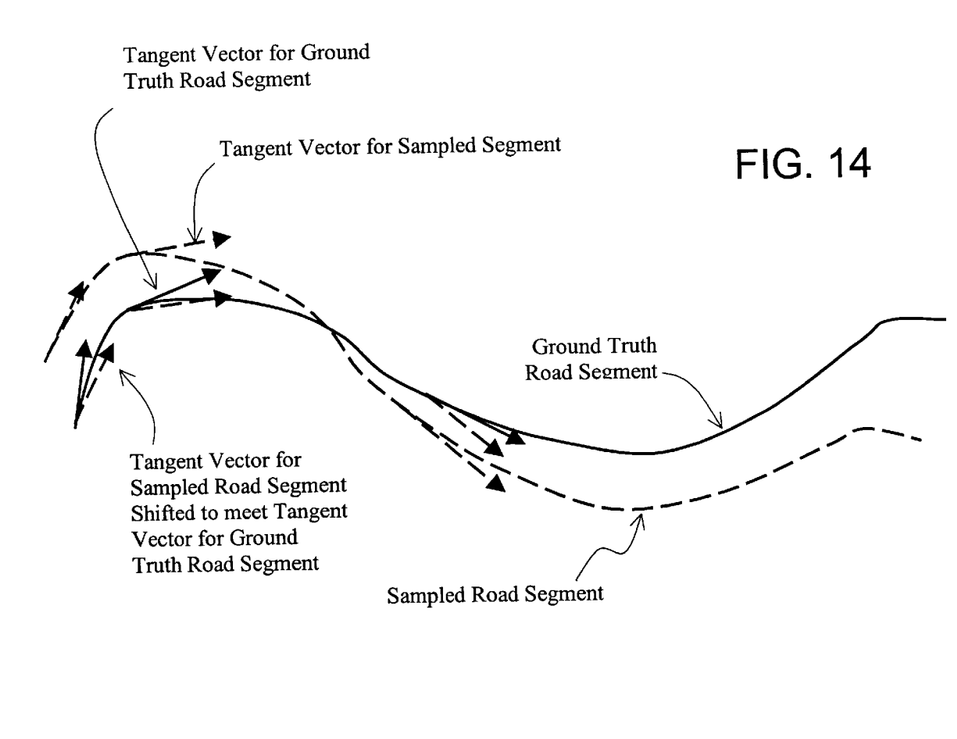
FIG. 14 is a diagram that illustrates application of the rotational variation metric to determining the relative accuracy of a geographic database.

The rotational variation metric can be directly applied to evaluating the accuracy of a geographic database. Application of this concept to evaluating how closely a representation of a geographic feature (e.g., a road segment) matches the actual geographic feature (ground truth) is described in connection with FIG. 14. This figure is similar to FIG. 2 except that the two shapes are now labeled as "Ground Truth Road Segment" and "Sampled Road Segment", respectively. By computing the rotational variation coefficient for the pair of segments as described in relation to FIG. 2, the accuracy of the sampled road segment with respect to the ground truth road segment can be determined. The smaller the value of the rotational variation coefficient, the closer the shape of the sampled segment is compared with the ground truth segment. If the rotational variation coefficient is zero, then the sampled road segment is identical in shape to the ground truth road segment, (though it may be translated and or rotated with respect to the ground truth segment.) The rotational variation coefficient can thus be used to determine the relative or shape accuracy of features represented in a geographic database.

V. Advantages

The rotational variation metric, disclosed herein, provides several advantages over conventional methods for shape comparison. One advantage of the rotational variation metric is that the geometric shapes being compared do not have to be aligned. The metric can be computed directly from the geometric shapes in their original positions.

The independence of the rotational variation metric from the need for alignment is useful for the various applications mentioned above. As described above, use of the rotational variation metric for template matching for sign recognition obviates the need for rotations and translations of the objects, since only the variation in the angle between the objects is measured. That is, the constancy of the angle is of interest and not the actual value of that angle. Furthermore, the algorithm is invariant to the scale at which the objects are displayed, since the size of the objects is scaled for comparison.

It is intended that the foregoing detailed description be regarded as illustrative rather than limiting and that it is understood that the following claims including all equivalents are intended to define the scope of the invention.

I claim:

1. A method of comparing first and second geometric shapes wherein at least one of the geometric shapes represents a geographic feature to indicate how closely the geometric shapes match, the method comprising:
   scaling the first and second geometric shapes to have equal lengths;
   determining tangent vectors at a plurality of corresponding locations along first and second geometric shapes;
   computing the angle between the tangent vectors determined at each of the corresponding locations;
   computing a deviation of the angles from a constant; and
   using the deviation as a rotational variation metric to indicate how closely the first and second geometric shapes match.

2. The method of claim 1 further comprising:
   constructing a plot of the angle between the tangent vectors as a function of the length along one of the shapes.

3. The method of claim 2 further comprising:
   computing the variance of the plot around a mean value.

4. The method of claim 1 further comprising:
   designating the first of the geometric shapes as a reference shape and the second of the geometric shapes as a non-reference shape.

5. The method of claim 1 wherein the first geometric shape represents a vehicle trajectory and the second geometric shape represents a path of a road segment.

6. The method of claim 1 wherein the first geometric shape represents a detected outline of a sign and the second geometric shape represents a template of a shape of a road sign.

7. The method of claim 1 wherein the first geometric shape represents a data representation of a road and the second geometric shape represents a ground truth representation of a road.

8. A vehicle positioning method comprising:
   determining a trajectory of a vehicle;
   determining tangent vectors at a plurality of locations along said trajectory;
   determining tangent vectors at corresponding of the plurality of locations along data representations of paths of a plurality of roads upon which the vehicle may be located;
   determining the angle between the tangent vectors determined for the trajectory and the corresponding tangent vectors determined for each of the data representations of the paths of the plurality of roads to determine a rotational variation coefficient associated with each of the data representations of the paths of the plurality of roads with respect to the trajectory; and
   determining that the vehicle is located on that road for which the rotational variation coefficient is smallest.

9. A method of evaluating the accuracy of a database that represents geographic features, the method comprising:
   for data that represent geographic features having shape, determining tangent vectors at a plurality of locations along a data representation of the shape of a geographic feature;
   determining tangent vectors at corresponding of the plurality of locations along a representation of an actual shape of the geographic feature;
   determining the angle between the tangent vectors determined for the data representation of the shape of a geographic feature and the corresponding tangent vectors determined for the actual shape of the geographic feature; and
   determining the variation of the angle around its mean value for the data representation of the shape of a geographic feature and the actual shape of the geographic feature,
   whereby the variation is used as a rotational variation metric to indicate how closely the data representation of the shape of the geographic feature matches the actual shape of the geographic feature.

10. The method of claim 9 wherein the geographic feature is a road.

11. A method of comparing geometric shapes that represent geographic features, the method comprising:
    determining a rotational variation metric from the geometric shapes, wherein the rotational variation metric is formed by:
      scaling the shapes to be compared to have equal lengths;
      selecting corresponding starting points on each of the geometric shapes;
      at each of a plurality of corresponding locations along each of said shapes, determining a tangent vector;
      for each corresponding location, determining the angle between corresponding pairs of tangent vectors;
      plotting the angle between the tangent vectors as a function of length along one of the shapes; and
      determining the variance of the plot around its mean value.

12. The method of claim 11 wherein one of said geometric shapes is a historical trajectory of a vehicle for a finite time.

13. The method of claim 12 wherein the other of said geometric shapes is a path of a road as represented by data contained in a map database.

14. The method of claim 11 wherein one of said geometric shapes is a detected sign object.

15. The method of claim 14 wherein the other of said geometric shapes is a sign shape template.

16. The method of claim 11 wherein one of said geometric shapes is a sampled road segment.

17. The method of claim 16 wherein the other of said geometric shapes is a ground truth road segment.

* * * * *